(12) United States Patent
Liu et al.

(10) Patent No.: US 11,677,238 B2
(45) Date of Patent: Jun. 13, 2023

(54) ELECTRIC POWER SUPPLY METHOD AND ELECTRIC POWER SUPPLY SYSTEM

(71) Applicant: YANTAI JEREH PETROLEUM EQUIPMENT & TECHNOLOGIES CO., LTD., Yantai (CN)

(72) Inventors: Weiwei Liu, Yantai (CN); Kaishen Liu, Yantai (CN); Shouzhe Li, Yantai (CN); Zhuqing Mao, Yantai (CN); Haoliang Sun, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 0 days.

(21) Appl. No.: 17/728,667

(22) Filed: Apr. 25, 2022

(65) Prior Publication Data

US 2022/0345007 A1    Oct. 27, 2022

(30) Foreign Application Priority Data

Apr. 26, 2021 (CN) .......................... 202110455679.3

(51) Int. Cl.
*H02J 1/00* (2006.01)
*B01F 35/32* (2022.01)

(52) U.S. Cl.
CPC ........... *H02J 1/00* (2013.01); *B01F 35/32045* (2022.01)

(58) Field of Classification Search
CPC ...... H02J 1/00; H02J 1/084; H02J 3/00; H02J 1/002; H02J 1/102; H02J 7/34; B01F 35/32045
See application file for complete search history.

(56) References Cited

U.S. PATENT DOCUMENTS 1,711,979 A    5/1929  Helmut
2,015,745 A   10/1935  Max
(Continued)

FOREIGN PATENT DOCUMENTS

CA    2908276 A1    4/2016
CN  101636901 A    1/2010
(Continued)

OTHER PUBLICATIONS

Written Opinion and International Search Report for PCT Application No. PCT/CN2022/076452 dated Jun. 1, 2022.
(Continued)

*Primary Examiner* — Rexford N Barnie
*Assistant Examiner* — Rasem Mourad

(57) ABSTRACT

Embodiments of the present application provide electric power supply methods and electric power supply systems related to the field of electrical energy technology. An electric power supply method includes: acquiring an electrical energy parameter of electrical energy delivered by an upstream power supply system, and determining, based on the electrical energy parameter, whether a preset power supply condition for supplying power to a downstream target power-consuming system is met; determining a target distribution port corresponding to the target power-consuming system from a plurality of preset distribution ports when the preset power supply condition is met; controlling a supply of electric power to the target power-consuming system through the target distribution port.

19 Claims, 6 Drawing Sheets

(56) References Cited

U.S. PATENT DOCUMENTS

| | | | |
|---|---|---|---|
| 3,035,222 A | 5/1962 | Stone | |
| 3,378,755 A | 4/1968 | Sawyer | |
| 3,453,443 A | 7/1969 | Stoeckly | |
| 3,794,377 A | 2/1974 | Wachsmuth et al. | |
| 3,815,965 A | 6/1974 | Ostwald | |
| 4,136,432 A | 1/1979 | Melley, Jr. | |
| 4,201,523 A | 5/1980 | Olofsson | |
| 4,336,485 A | 6/1982 | Stroud | |
| 4,720,645 A | 1/1988 | Stroud | |
| 4,793,775 A | 12/1988 | Peruzzi | |
| 4,904,841 A | 2/1990 | English | |
| 4,992,669 A | 2/1991 | Parmley | |
| 5,274,322 A | 12/1993 | Hayashi et al. | |
| 5,517,822 A | 5/1996 | Haws et al. | |
| 5,614,799 A | 3/1997 | Anderson et al. | |
| 5,691,590 A | 11/1997 | Kawai et al. | |
| 5,714,821 A | 2/1998 | Dittman | |
| 5,751,150 A * | 5/1998 | Rippel | G01R 31/2841 363/72 |
| 5,821,660 A | 10/1998 | Anderson | |
| 5,846,056 A | 12/1998 | Dhindsa et al. | |
| 5,994,802 A | 11/1999 | Shichijyo et al. | |
| 6,121,707 A | 9/2000 | Bell et al. | |
| 6,134,878 A | 10/2000 | Amako et al. | |
| 6,281,610 B1 | 8/2001 | Kliman et al. | |
| 6,331,760 B1 | 12/2001 | Mclane, Jr. | |
| 6,388,869 B1 | 5/2002 | Fauteux et al. | |
| 6,417,592 B2 | 7/2002 | Nakamura et al. | |
| 6,450,133 B1 | 9/2002 | Bernard et al. | |
| 6,455,974 B1 | 9/2002 | Fogarty | |
| 6,552,463 B2 | 4/2003 | Oohashi et al. | |
| 6,704,993 B2 | 3/2004 | Fogarty | |
| 6,765,304 B2 | 7/2004 | Baten et al. | |
| 6,784,583 B2 | 8/2004 | Umeda | |
| 6,786,051 B2 | 9/2004 | Kristich et al. | |
| 6,893,487 B2 | 5/2005 | Alger et al. | |
| 6,895,903 B2 | 5/2005 | Campion | |
| 7,007,966 B2 | 3/2006 | Campion | |
| 7,016,207 B2 | 3/2006 | Yamanaka et al. | |
| 7,075,206 B1 | 7/2006 | Chen | |
| 7,081,682 B2 | 7/2006 | Campion | |
| 7,112,891 B2 | 9/2006 | Johnson et al. | |
| 7,122,913 B2 | 10/2006 | Witten et al. | |
| 7,221,061 B2 | 5/2007 | Alger et al. | |
| 7,245,032 B2 | 7/2007 | Willets et al. | |
| 7,291,954 B2 | 11/2007 | Kashihara et al. | |
| 7,372,174 B2 | 5/2008 | Jones et al. | |
| 7,511,385 B2 | 3/2009 | Jones et al. | |
| 7,608,934 B1 | 10/2009 | Hunter | |
| 7,615,877 B2 | 11/2009 | Willets et al. | |
| 7,619,319 B1 | 11/2009 | Hunter | |
| 7,635,926 B2 | 12/2009 | Willets et al. | |
| 7,656,052 B2 | 2/2010 | Jones et al. | |
| 7,667,342 B2 | 2/2010 | Matsumoto et al. | |
| 7,692,321 B2 | 4/2010 | Jones et al. | |
| 7,755,209 B2 | 7/2010 | Jones et al. | |
| 7,921,914 B2 | 4/2011 | Bruins et al. | |
| 8,159,082 B2 | 4/2012 | Gemin et al. | |
| 8,294,285 B2 | 10/2012 | Hunter | |
| 8,294,286 B2 | 10/2012 | Hunter | |
| 8,362,638 B2 | 1/2013 | Gemin et al. | |
| 8,495,869 B2 | 7/2013 | Beissler et al. | |
| 8,519,591 B2 | 8/2013 | Nishimura | |
| 8,587,136 B2 | 11/2013 | Williams | |
| 8,670,260 B2 | 3/2014 | Wang et al. | |
| 8,731,793 B2 | 5/2014 | Barbir et al. | |
| 8,773,876 B2 | 7/2014 | Kuboyama et al. | |
| 8,789,601 B2 | 7/2014 | Broussard et al. | |
| 8,796,899 B2 | 8/2014 | Imazawa et al. | |
| 8,811,048 B2 | 8/2014 | Zhang et al. | |
| 9,103,193 B2 | 8/2015 | Coli et al. | |
| 9,140,110 B2 | 9/2015 | Coli et al. | |
| 9,166,495 B2 | 10/2015 | Guan | |
| 9,209,704 B2 | 12/2015 | Huang | |
| 9,534,473 B2 | 1/2017 | Morris et al. | |
| 9,562,420 B2 | 2/2017 | Morris et al. | |
| 9,577,545 B2 | 2/2017 | Tan et al. | |
| 9,641,112 B2 | 5/2017 | Harknett et al. | |
| 10,184,397 B2 | 1/2019 | Austin et al. | |
| 10,411,635 B2 | 9/2019 | Takahashi | |
| 10,523,130 B2 | 12/2019 | Bax et al. | |
| 10,584,671 B2 | 3/2020 | Tunzini et al. | |
| 10,648,311 B2 | 5/2020 | Oehring et al. | |
| 10,855,142 B2 | 12/2020 | Cory | |
| 10,865,624 B1 | 12/2020 | Cui et al. | |
| 10,914,155 B2 | 2/2021 | Oehring et al. | |
| 11,035,214 B2 | 6/2021 | Cui et al. | |
| 11,109,508 B1 | 8/2021 | Yeung et al. | |
| 11,125,066 B1 | 9/2021 | Yeung et al. | |
| 11,208,878 B2 | 12/2021 | Oehring et al. | |
| 11,220,895 B1 | 1/2022 | Yeung et al. | |
| 11,378,008 B2 | 7/2022 | Yeung et al. | |
| 11,391,136 B2 | 7/2022 | Coli et al. | |
| 11,434,737 B2 | 9/2022 | Oehring et al. | |
| 11,459,863 B2 | 10/2022 | Robinson et al. | |
| 2003/0030246 A1 | 2/2003 | Campion | |
| 2003/0033994 A1 | 2/2003 | Campion | |
| 2003/0057704 A1 | 3/2003 | Baten et al. | |
| 2003/0064858 A1 | 4/2003 | Saeki et al. | |
| 2003/0079479 A1 | 5/2003 | Kristich et al. | |
| 2004/0081561 A1 | 4/2004 | Iwanami et al. | |
| 2004/0104577 A1 | 6/2004 | Alger et al. | |
| 2004/0174723 A1 | 9/2004 | Yamanaka et al. | |
| 2005/0093496 A1 | 5/2005 | Tokunou et al. | |
| 2006/0066105 A1 | 3/2006 | Johnson et al. | |
| 2006/0066108 A1 | 3/2006 | Willets et al. | |
| 2006/0080971 A1 | 4/2006 | Smith et al. | |
| 2006/0208594 A1 | 9/2006 | Kashihara et al. | |
| 2006/0260331 A1 | 11/2006 | Andreychuk | |
| 2007/0108771 A1 | 5/2007 | Jones et al. | |
| 2007/0121354 A1 | 5/2007 | Jones et al. | |
| 2007/0216452 A1 | 9/2007 | Matsumoto et al. | |
| 2009/0146426 A1 | 6/2009 | Jones et al. | |
| 2009/0146500 A1 | 6/2009 | Jones et al. | |
| 2009/0147549 A1 | 6/2009 | Jones et al. | |
| 2009/0308602 A1 | 12/2009 | Bruins et al. | |
| 2010/0060076 A1 | 3/2010 | Gemin et al. | |
| 2010/0084922 A1 | 4/2010 | Gollentz et al. | |
| 2010/0135840 A1 | 6/2010 | Fujimoto et al. | |
| 2012/0002454 A1 | 1/2012 | Kuboyama et al. | |
| 2012/0065787 A1 * | 3/2012 | Broniak | H02J 3/14 700/287 |
| 2012/0175947 A1 | 7/2012 | Gemin et al. | |
| 2012/0248922 A1 | 10/2012 | Imazawa et al. | |
| 2012/0255734 A1 | 10/2012 | Coli et al. | |
| 2013/0063070 A1 | 3/2013 | Zhang et al. | |
| 2013/0182468 A1 | 7/2013 | Guan | |
| 2013/0229836 A1 | 9/2013 | Wang et al. | |
| 2013/0234522 A1 | 9/2013 | Tan et al. | |
| 2013/0255153 A1 | 10/2013 | Sasaki et al. | |
| 2014/0096974 A1 | 4/2014 | Coli et al. | |
| 2014/0138079 A1 | 5/2014 | Broussard et al. | |
| 2014/0174717 A1 | 6/2014 | Broussard et al. | |
| 2014/0210213 A1 | 7/2014 | Campion et al. | |
| 2014/0219824 A1 | 8/2014 | Burnette | |
| 2014/0312823 A1 | 10/2014 | Huang | |
| 2015/0027712 A1 | 1/2015 | Vicknair et al. | |
| 2015/0068754 A1 | 3/2015 | Coli et al. | |
| 2015/0252661 A1 | 9/2015 | Glass | |
| 2015/0300145 A1 | 10/2015 | Coli et al. | |
| 2015/0314255 A1 | 11/2015 | Coli et al. | |
| 2016/0041066 A1 | 2/2016 | Patenaude et al. | |
| 2016/0075387 A1 | 3/2016 | Fong et al. | |
| 2016/0105022 A1 | 4/2016 | Oehring et al. | |
| 2016/0177675 A1 | 6/2016 | Morris et al. | |
| 2016/0177678 A1 | 6/2016 | Morris et al. | |
| 2016/0369609 A1 | 12/2016 | Morris et al. | |
| 2017/0104389 A1 | 4/2017 | Morris et al. | |
| 2017/0154387 A1 * | 6/2017 | Somers | H02J 3/14 |
| 2017/0222409 A1 | 8/2017 | Oehring et al. | |
| 2017/0285062 A1 | 10/2017 | Kim | |
| 2017/0302135 A1 | 10/2017 | Cory | |
| 2017/0305284 A1 * | 10/2017 | Koh | B60L 58/12 |
| 2018/0059754 A1 * | 3/2018 | Shaikh | H02J 1/12 |

(56) References Cited

U.S. PATENT DOCUMENTS

| | | | |
|---|---|---|---|
| 2018/0080376 A1 | 3/2018 | Austin et al. | |
| 2018/0080377 A1 | 3/2018 | Austin et al. | |
| 2018/0156210 A1 | 6/2018 | Oehring et al. | |
| 2018/0328157 A1 | 11/2018 | Bishop | |
| 2019/0100989 A1 | 4/2019 | Stewart et al. | |
| 2019/0128265 A1 | 5/2019 | Washio et al. | |
| 2019/0157982 A1* | 5/2019 | Brueckner | H02H 9/001 |
| 2019/0169971 A1 | 6/2019 | Oehring et al. | |
| 2019/0195292 A1 | 6/2019 | Pan et al. | |
| 2019/0229643 A1 | 7/2019 | Bax et al. | |
| 2019/0319459 A1* | 10/2019 | Brathwaite | G05B 15/02 |
| 2019/0331080 A1 | 10/2019 | Tunzini et al. | |
| 2020/0040705 A1 | 2/2020 | Morris et al. | |
| 2020/0040878 A1 | 2/2020 | Morris | |
| 2020/0049136 A1 | 2/2020 | Stephenson | |
| 2020/0109617 A1 | 4/2020 | Oehring et al. | |
| 2020/0325760 A1 | 10/2020 | Markham | |
| 2021/0040830 A1 | 2/2021 | Mu et al. | |
| 2021/0095552 A1 | 4/2021 | Oehring et al. | |
| 2021/0095648 A1 | 4/2021 | Buckley et al. | |
| 2021/0102451 A1 | 4/2021 | Robinson et al. | |
| 2021/0102530 A1 | 4/2021 | Pruitt et al. | |
| 2021/0107616 A1* | 4/2021 | Pedersen | B63H 21/17 |
| 2021/0199161 A1 | 7/2021 | Eto et al. | |
| 2021/0301630 A1 | 9/2021 | Krippner et al. | |
| 2021/0310341 A1 | 10/2021 | Sherman et al. | |
| 2022/0018232 A1 | 1/2022 | Oehring et al. | |
| 2022/0213777 A1 | 7/2022 | Cui et al. | |
| 2022/0364448 A1 | 11/2022 | Oehring et al. | |

FOREIGN PATENT DOCUMENTS

| | | |
|---|---|---|
| CN | 101639040 A | 2/2010 |
| CN | 101728860 A | 6/2010 |
| CN | 201570910 U | 9/2010 |
| CN | 102574475 A | 7/2012 |
| CN | 102602322 A | 7/2012 |
| CN | 102810909 A | 12/2012 |
| CN | 103310963 A | 9/2013 |
| CN | 104578389 A | 4/2015 |
| CN | 204386465 U | 6/2015 |
| CN | 105763337 A | 7/2016 |
| CN | 106711990 A | 5/2017 |
| CN | 107231000 A | 10/2017 |
| CN | 107240915 A | 10/2017 |
| CN | 207652040 U | 7/2018 |
| CN | 108900136 A | 11/2018 |
| CN | 110107490 A | 8/2019 |
| CN | 110118127 A | 8/2019 |
| CN | 110821464 A | 2/2020 |
| CN | 210183018 U | 3/2020 |
| CN | 111181159 A | 5/2020 |
| CN | 210780534 U | 6/2020 |
| CN | 111628519 A | 9/2020 |
| CN | 111769551 A | 10/2020 |
| CN | 212671744 A | 3/2021 |
| CN | 213027453 U | 4/2021 |
| CN | 112983382 A | 6/2021 |
| CN | 112993965 A | 6/2021 |
| CN | 113006757 A | 6/2021 |

OTHER PUBLICATIONS

Non-Final Office Action for U.S. Appl. No. 17/242,316 dated May 26, 2022.
Search Report for Chinese Application No. 202110455679.3 dated May 28, 2022.
International Preliminary Report on Patentability Chapter I for PCT Application No. PCT/CN2019/102811 dated Dec. 23, 2021.
Wri ttten Opinion of the International Searching Authority and International Search Report for PCT Application No. PCT/CN2019/102811 dated Mar. 19, 2020.
Non-Final Office Action for U.S. Appl. No. 16/834,446 dated Jun. 5, 2020.
Non-Final Office Action for U.S. Appl. No. 16/834,446 dated Jan. 6, 2021.
Written Opinion and International Search Report for PCT Application No. PCT/CN2021/132090 dated Jul. 7, 2022.
Non-Final Office Action for U.S. Appl. No. 17/884,358 dated Dec. 8, 2022.
Non-Final Office Action for U.S. Appl. No. 17/733,922 dated Sep. 21, 2022.
Final Office Action for U.S. Appl. No. 17/733,922 dated Dec. 28, 2022.
First Search for Chinese Application No. 202280000733.8 dated Mar. 14, 2023.

* cited by examiner

ELECTRIC POWER SUPPLY METHOD AND ELECTRIC POWER SUPPLY SYSTEM

CROSS-REFERENCE TO RELATED APPLICATIONS

This application claims priority to Chinese Patent Application No. 202110455679.3, filed on Apr. 26, 2021, the contents of which are incorporated herein by reference in the entirety.

TECHNICAL FIELD

The present application refers to the field of electrical energy technology, and in particular to an electric power supply method and an electric power supply system.

BACKGROUND

Hydraulic fracturing technology is an important technology commonly used in shale gas, shale oil, tight gas, tight oil, coalbed methane wells, etc. A mixture is obtained by mixing water, sand, chemical additives, etc. through a mixing device, and then the mixture is injected into a well under high pressure by a pumping system to form fractures. The fractures form channels through which gas and oil can be efficiently discharged. In conventional fracturing operations, the power source for the mixing device, water supply device, and sand supply device is diesel fuel, which is not environmentally friendly or economical.

SUMMARY

Embodiments of the present application provide an electric power supply method and an electric power supply system, which supply power to downstream target power-consuming system for operating based on electric energy. This resolves the environmentally unfriendly and uneconomical problems due to using the traditional diesel as the power source, and possesses the characteristics of a high degree of integration and less interference etc.

In a first aspect, an embodiment of the present application provides an electric power supply method, including: acquiring an electrical energy parameter of electrical energy delivered by an upstream power supply system; determining, based on the electrical energy parameter, whether a preset power supply condition for supplying power to a downstream target power-consuming system is met; determining a target distribution port corresponding to the target power-consuming system from a plurality of preset distribution ports when the preset power supply condition is met; controlling a supply of electric power to the target power-consuming system through the target distribution port.

In a second aspect, an embodiment of the present application provides an electric power supply system, including: a power supply controller, a main transformer, a rectifier filter unit and a control transformer; the power supply controller being connected to the main transformer, the rectifier filter unit and the control transformer, and being configured for acquiring an electrical energy parameter of electrical energy delivered by an upstream power supply system, determining, based on the electrical energy parameter, whether a preset power supply condition for supplying power to a downstream target power-consuming system is met; determining a target distribution port corresponding to the target power-consuming system from a plurality of preset distribution ports when the preset power supply condition is met, and sending a first power supply signal to the main transformer, the rectifier filter unit and the control transformer; the main transformer, the rectifier filter unit and the control transformer being configured for supplying electric power to the target power-consuming system through the corresponding target distribution port upon receiving the first power supply signal sent by the power supply controller.

Electric power supply methods and electric power supply systems are provided in the embodiments of the present application. In various embodiments, an electrical energy parameter of electrical energy delivered by an upstream power supply system is acquired, and when it is determined based on the electrical energy parameter that a preset power supply condition for supplying power to a downstream target power-consuming system is met, a target distribution port corresponding to the target power-consuming system is determined from a plurality of preset distribution ports; and the supply of power to the target power-consuming system through the target distribution port is controlled. As a result, the target power-consuming system can operate based on electric energy, which not only solves the environmentally unfriendly and uneconomical problems due to using the traditional diesel as the power source, but also makes it possible to supply power to multiple target power-consuming systems simultaneously with a high degree of integration and less interference.

DESCRIPTION OF DRAWINGS

In order to more clearly illustrate the technical solution in one or more embodiments of the present application or in prior art, the following is a brief description of the drawings required for use in the description of the embodiments or prior art, it is clear that the drawings in the following description are only some of the embodiments recorded in the present application, and it is also possible for a person of ordinary skill in the art to obtain other drawings based on these drawings without creative labor.

DETAILED DESCRIPTION

In order to enable a person in the art to better understand the technical solutions in the embodiments of this application, the technical solutions in the embodiments of this application will be clearly and completely described below in conjunction with the drawings of the embodiments of this application, and it is clear that the described embodiments are only a part of the embodiments of this application, and not all of them. Based on the embodiments of the present application, all other embodiments obtained by a person of ordinary skill in the art without creative labor shall fall within the scope of protection of the present application.

Figure 1:
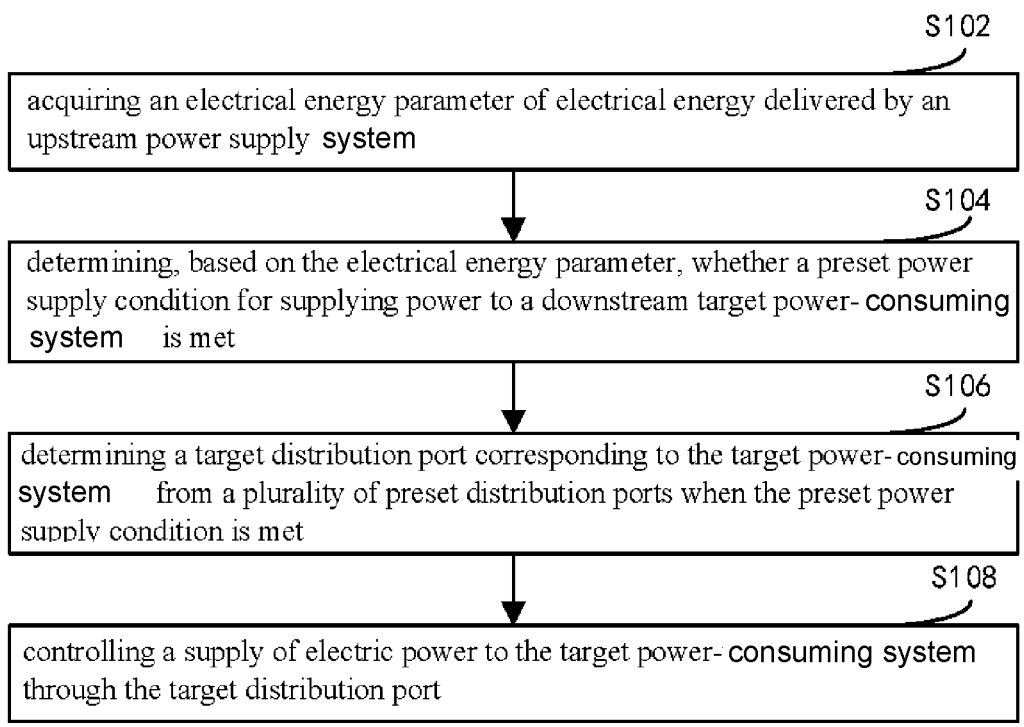
FIG. 1 is a first flow diagram of an electric power supply method, according to various embodiments of the present application.

FIG. 1 is a schematic flow diagram of an electric power supply method, according to various embodiments of the present application. As shown in FIG. 1, the method includes the following steps.

Step S102 includes acquiring an electrical energy parameter of electrical energy delivered by an upstream power supply system;

The electric power supply method provided in the embodiments of the present application can be performed by a power supply controller in an electric power supply system. In one example, after the electric power supply system is connected to the upstream power supply system, the upstream power supply system delivers electrical energy to the electric power supply system; the power supply controller acquires the electrical energy parameter of the electrical energy delivered by the upstream power supply system.

The electric power supply system may also include a main transformer, a rectifier filter unit, etc. Since the main transformer is an inductive load, it may cause a huge shock to the upstream power supply system in the process of receiving the electrical energy delivered by the upstream power supply system. In order to avoid such shock, the electric power supply system, in one or more embodiments of this application, may also include a power-up buffer device, which may pre-magnetize the main transformer based on the electrical energy delivered by the upstream power supply system, thus avoiding the shock to the upstream power supply system. Accordingly, the above-mentioned electrical energy parameter may include status information of the pre-magnetization of the main transformer performed by the power-up buffer device and an output voltage of the electric power supply system. The upstream power supply system can be a generator, a utility system, etc., which can be set according to the needs in practice. The specific structure of the electric power supply system can be described later.

Step S104 includes determining, based on the electrical energy parameter, whether a preset power supply condition for supplying power to a downstream target power-consuming system is met.

In one example, if it is determined that the status information in the electrical energy parameter indicates the completion of pre-magnetization and the output voltage in the electrical energy parameter reaches a preset voltage, it is thus determined that the preset power supply condition for supplying power to the downstream target power-consuming system is met. The target power-consuming system may be connected to the electric power supply system before the upstream power supply system delivers electrical energy to the electric power supply system; the target power-consuming system may include one or more of a DC power-consuming system, an AC power-consuming system, etc.

Step S106 includes determining a target distribution port corresponding to the target power-consuming system from a plurality of preset distribution ports when the preset power supply condition is met.

The electric power supply system in the embodiments of the present application is provided with a plurality of distribution ports, capable of accessing a plurality of power-consuming systems simultaneously and supplying electric power to the plurality of power-consuming systems simultaneously, i.e. with a high degree of integration and high power supply efficiency. By determining the target distribution port corresponding to the target power-consuming system, electric power is supplied to each target power-consuming system through the target distribution port simultaneously.

Step S108, controlling a supply of electric power to the target power-consuming system through the target distribution port.

In the embodiments of the present application, an electrical energy parameter of electrical energy delivered by an upstream power supply system is acquired, and when it is determined based on the electrical energy parameter, that a preset power supply condition for supplying power to a downstream target power-consuming system is met, a target distribution port corresponding to the target power-consuming system is determined from a plurality of preset distribution ports; and the supply of electric power to the target power-consuming system through the target distribution port is controlled. As a result, the target power-consuming system can operate based on electric energy, which not only solves the environmentally unfriendly and uneconomical problems due to using the traditional diesel as the power source, but also makes it possible to supply power to multiple target power-consuming systems simultaneously with a high degree of integration, high power supply efficiency, and less interference.

In order to avoid damage to the downstream target power-consuming system due to unexpected conditions such as a sudden increase in current or a short circuit during the supply of power to the target power-consuming system, in one or more embodiments of the present application, in step S104, after determining that the preset power supply condition is met, the method may further include: acquiring a power consumption parameter of the target power-consuming system, generating a protection parameter of the target power-consuming system according to the acquired power consumption parameter in a preset manner; performing a protecting processing for the target power-consuming system based on the protection parameter.

In one example, a power and a rated voltage of the target power-consuming system input by the user are received, a rated current of the target power-consuming system is determined according to the relationship among a preset power, the rated voltage, and the rated current; the rated current is determined as the protection parameter of the target power-consuming system, and the circuit is disconnected when it is determined that the supply current is greater than the rated current, to play a protective role for the target power-consuming system. Alternatively, the power supply controller determines the rated voltage and the rated current as protection parameters of the target power-consuming system, and disconnects the circuit when it is determined that the supply voltage is greater than the rated voltage, or the supply current is greater than the rated current, in order to play a protective role for the target power-consuming system.

Figure 2:
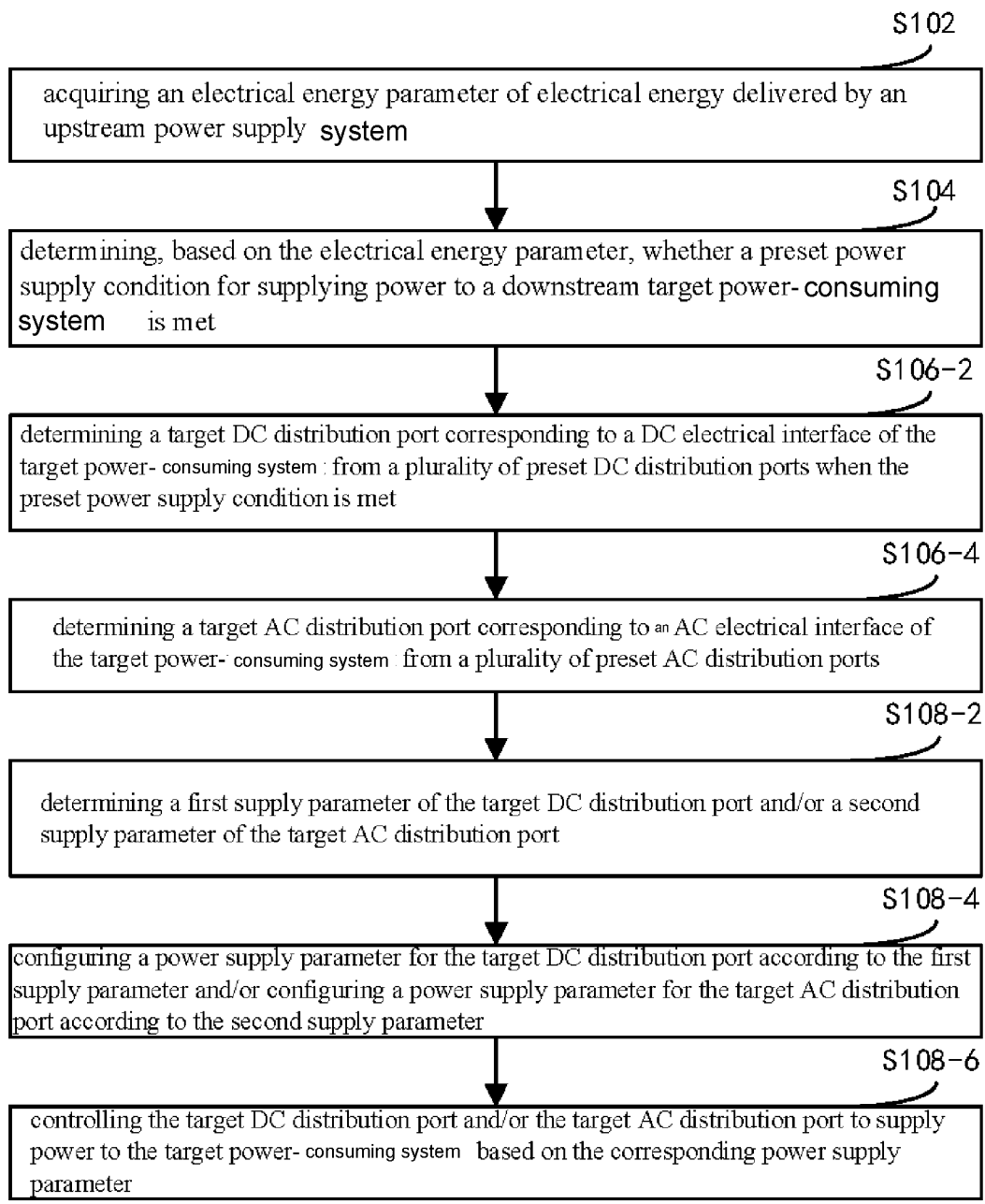
FIG. 2 is a second flow diagram of an electric power supply method, according to various embodiments of the present application.

Considering that in practical applications, such as well sites, coal mines, and other operational scenarios, multiple types of system such as DC power-consuming system, AC power-consuming system, etc. are often presented, in order to be able to effectively supply power to the target power-consuming system, in one or more embodiments of the present application, as shown in FIG. 2, step S106 may include Step S106-2 and Step S106-4.

Step S106-2 includes determining a target DC distribution port corresponding to a DC electrical interface of the target power-consuming system from a plurality of preset DC distribution ports when the preset power supply condition is met.

In one or more embodiments of the present application, the target DC distribution port may be determined by detecting a current signal. In one example, the step S106-2 of determining a target DC distribution port corresponding to a DC electrical interface of the target power-consuming system from a plurality of preset DC distribution ports may include: detecting whether a current signal corresponding to a respective DC distribution port meets a preset condition, and if yes, determining a corresponding DC distribution port as a target DC distribution port corresponding to a DC electrical interface of the target power-consuming system. Detecting whether a current signal corresponding to a respective DC distribution port meets a preset condition may include determining whether a detected current signal indicates the presence of a current, and if yes, determining that the preset condition is met, and if not, determining that the preset condition is not met.

In one or more embodiments of the present application, a target DC distribution port may also be determined by recording historical power supply information. In one example, the step S106-2 of determining a target DC distribution port corresponding to a DC electrical interface of the target power-consuming system from a plurality of preset DC distribution ports may include: acquiring an identification information of a target DC distribution port recorded during a previous power supply, displaying a prompt information based on the acquired identification information; determining whether a confirmation information generated by a user's confirmation operation of the prompt information is acquired, and if yes, the recorded target DC distribution port is determined to be the target DC distribution port corresponding to a DC electrical interface of the current target power-consuming system; if not, the DC distribution port corresponding to a received identification information inputted by the user is determined to be the target DC distribution port corresponding to a DC electrical interface of the current target power-consuming system.

Step S106-4 includes determining a target AC distribution port corresponding to an AC electrical interface of the target power-consuming system from a plurality of preset AC distribution ports.

Each AC distribution port is provided with a circuit breaker correspondingly, and the corresponding circuit breaker may be operated to conduct the circuit when the user connects an AC power-consuming system of the target power-consuming system to the electric power supply system. Accordingly, step S106-4 may include determining whether a closing signal is detected, and if yes, determining an AC distribution port corresponding to the closing signal as a target AC distribution port corresponding to an AC power interface of the target power-consuming system. The closing signal is a signal generated when the user operates the circuit breaker to conduct a circuit.

In some embodiments, the operation sequence of determining the target DC distribution port and determining the target AC distribution port can be interchanged and can also be executed simultaneously. A target distribution port may include only one of a target DC distribution port and a target AC distribution port. When it is determined that there is no target DC distribution port, i.e., the target distribution port includes only a target AC distribution port, the target power-consuming system is indicated as an AC power-consuming system; when it is determined that there is no target AC distribution port, i.e., the target distribution port includes only a target DC distribution port, the target power-consuming system is indicated as a DC power-consuming system.

Corresponding to steps S106-2 and S106-4 above, step S108, as shown in FIG. 2, may include the following steps S108-2 to S108-6.

Step S108-2 includes determining a first supply parameter of the target DC distribution port and/or a second supply parameter of the target AC distribution port.

To enable quick determination of the first supply parameter, in one or more embodiments of the present application, an association relationship between identification information of each DC distribution port and a corresponding power supply parameter is preset. Accordingly, determining a first supply parameter of the target DC distribution port may include: acquiring an associated power supply parameter from a preset association relationship between identification information and a power supply parameter according to identification information of the target DC distribution port, and determining the acquired power supply parameter as a first supply parameter of the target DC distribution port. Where, the first supply parameter can be a power supply voltage, a power supply current, etc.

In order to safely and efficiently supply power to each AC power-consuming system in the target power-consuming systems, in one or more embodiments of the present application, a maximum power that the electric power supply system can support is preset. Accordingly, determining a second supply parameter of the target AC distribution port may include: determining a power of each AC power-consuming system in the target power-consuming system, and determining the second supply parameter of the target AC distribution port based on the power. In one example, a power of each AC power-consuming system input by a user is received; or a power acquisition request is sent to each AC power-consuming system and a power sent by each AC power-consuming system is received. The received respective power is summed and processed to obtain a total power; if it is determined that the total power is less than the preset maximum power, the total power is determined as the second supply parameter. If it is determined that the total power is not less than the preset maximum power, the preset maximum power is determined as the second supply parameter.

Step S108-4 includes configuring a power supply parameter for the target DC distribution port according to the first supply parameter and/or configuring a power supply parameter for the target AC distribution port according to the second supply parameter.

Step S108-6 includes controlling the target DC distribution port and/or the target AC distribution port to supply power to the target power-consuming system based on the corresponding power supply parameter.

In some embodiments, when it is determined in step S106 that the target distribution port includes a target DC distribution port and a target AC distribution port, a first supply parameter of the target DC distribution port and a second supply parameter of the target AC distribution port are determined in step S108-2; accordingly, a configuration of power supply parameter for the target DC distribution port based on the first supply parameter and a configuration of power supply parameter for the target AC distribution port based on the second supply parameter are carried out; and in step S108-6, the target DC distribution port and the target AC distribution port are controlled to supply power to the target power-consuming system based on the corresponding power supply parameters. When it is determined in step S106 that the target distribution port includes one of a target DC distribution port and a target AC distribution port, only the corresponding power supply parameter is determined and configured in step S108, and the corresponding distribution port is controlled to supply power. In practical application, the above-mentioned operations can be performed according to the determined type of the target distribution port.

Thus, by determining the target distribution port and configuring the power supply parameter, each target distribution port can be powered safely and effectively based on the corresponding power supply parameter.

Considering that in practical applications, the upstream power supply system may fail and suddenly stop delivering electrical energy, in order to avoid that the target power-consuming system cannot operate normally or is damaged when the upstream power supply system suddenly stops supplying power, in one or more embodiments of this application, the electric power supply system further includes an energy storage device. Accordingly, the method further includes controlling the energy storage device of the electric power supply system to storage energy if a preset energy storage condition is determined to be met.

In some embodiments, the energy storage condition may be set according to the needs in the actual application, for example, acquiring a charge amount of electric energy currently stored by the energy storage device, and if it is determined that the acquired charge amount is less than a preset charge amount, it is determined that the preset energy storage condition is met. For another example, detecting an operation state of the target power-consuming system, and if the detected operation state indicates that the target power-consuming system is in a non-operation state, it is determined that the preset energy storage condition is met. For another example, detecting a supply power of the upstream power supply system and an operating power of the downstream target power-consuming system separately, and if the supply power is greater than the operating power, the preset energy storage condition is determined to be met.

Further, considering that in practical applications not all of the target power-consuming systems will be affected by a sudden cessation of power supply from an upstream power supply system, on this basis, in one or more embodiments of the present specification, the method further includes: determining a critical power-consuming system in the target power-consuming system and marking a first distribution port corresponding to the critical power-consuming system in target distribution ports; and, if it is determined that a preset emergency power supply condition is met, controlling the energy storage device to supply power to the critical power-consuming system through the first distribution port.

In some embodiments, determining a critical power-consuming system in the target power-consuming system and marking a first distribution port corresponding to the critical power-consuming system in target distribution ports, may include: sending a system type acquisition request to the target power-consuming system, and receiving a system type information sent by each target power-consuming system, determining a critical power-consuming system based on the system type information, and marking a distribution port corresponding to the critical power-consuming system as a first distribution port; or, receiving identification information of a distribution port input by a user, determining a power-consuming system connected to the distribution port corresponding to the identification information as a critical power-consuming system, and marking the distribution port corresponding to the identification information as a first distribution port; or predetermining identification information of each distribution port corresponding to a critical power-consuming system, matching identification information of each target distribution port currently determined with the preset identification information, marking a target distribution port corresponding to the successfully matched identification information as a first distribution port, and determining a corresponding target power-consuming system as the critical power-consuming system. The critical power-consuming system may include a system that cannot be suddenly disconnected during operation, and a system that is susceptible to the adverse effects of sudden disconnection, such as DC sand mixing system at the fracturing operation site, etc. The type of the critical power-consuming system can be set according to the needs in the actual application.

Further, determining that a preset emergency power supply condition is met may include detecting a supply voltage of the upstream power supply system, and if the supply voltage is less than a first preset voltage, determining that a preset emergency power supply condition is met; or, detecting an output voltage of the electric power supply system, and determining that a preset emergency power supply condition is met if the output voltage is less than a second preset voltage. The first preset voltage and the second preset voltage can be the same or different, the emergency power supply condition can be set in accordance with the needs of the actual application.

Further, in order to make the user aware of the emergency status and thus adjust the operating state of the target power-consuming system in a timely manner, one or more embodiments of the present application may also include: broadcasting an emergency power supply information when the power supply controller determines that the preset emergency power supply condition is met.

Thus, by controlling the energy storage device to store energy and determining the critical power system, the critical power system can be continuously powered based on the electrical energy stored in the energy storage device in the event of a sudden power failure due to an unforeseen situation at the upstream power supply system, which not only avoids the negative impact of the sudden power failure on the operation progress of the critical power system, but also protects the critical power system to avoid the damage of the critical power system caused by the sudden power failure.

With the electric power supply method provided in the embodiments of the present application, an electrical energy parameter of electrical energy delivered by an upstream power supply system is acquired, and when it is determined, based on the electrical energy parameter, that a preset power supply condition for supplying power to a downstream target power-consuming system is met, a target distribution port corresponding to the target power-consuming system is determined from a plurality of preset distribution ports; and the supply of electric power to the target power-consuming system through the target distribution port is controlled. As a result, the target power-consuming system can operate based on electric energy, which not only solves the environmentally unfriendly and uneconomical problems due to using the traditional diesel as the power source, but also makes it possible to supply power to multiple target power-consuming systems simultaneously with a high degree of integration, high power supply efficiency and less interference.

Figure 3:
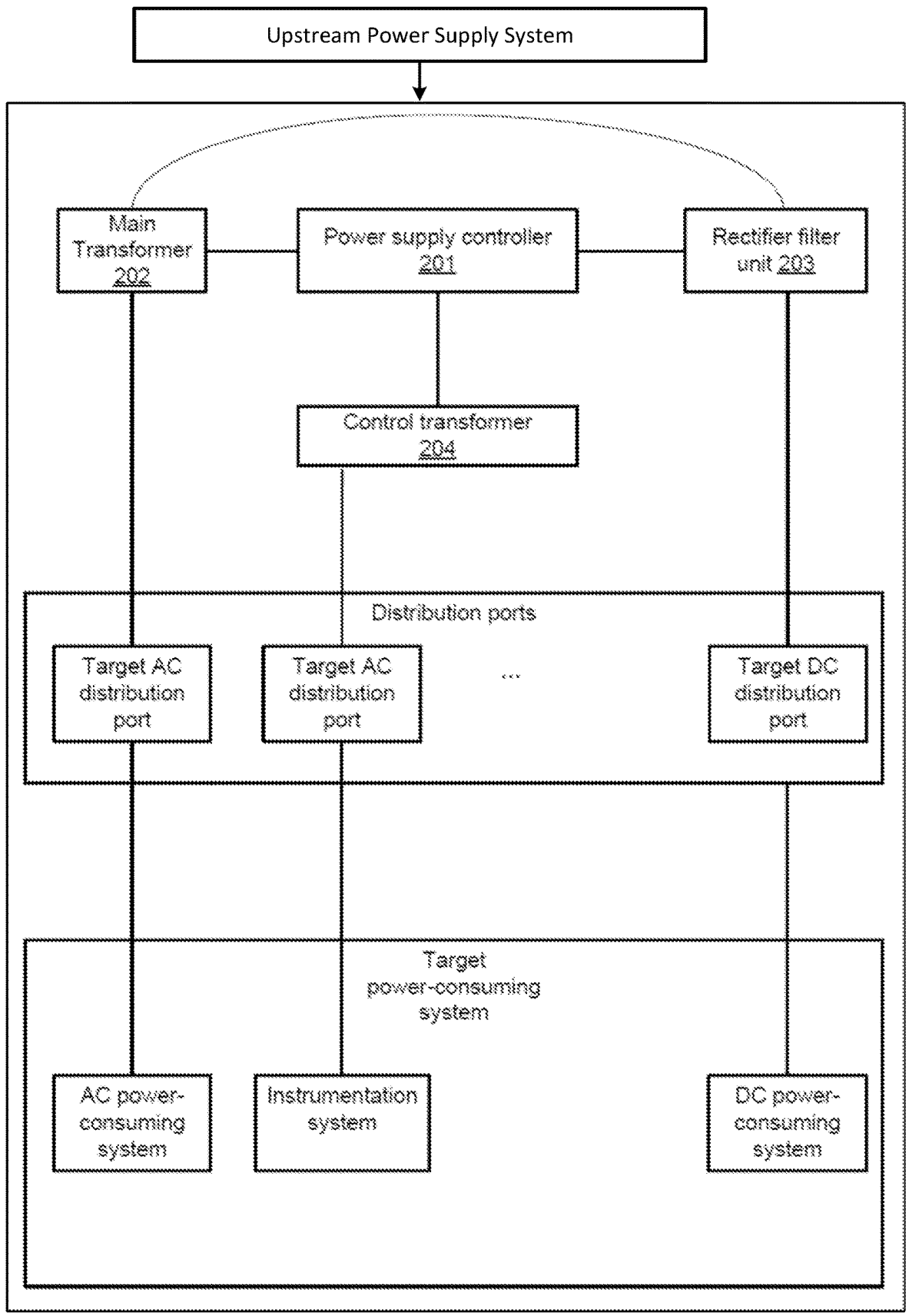
FIG. 3 is a first schematic composition diagram of an electric power supply system, according to various embodiments of the present application.

Corresponding to the electric power supply method described above, based on the same technical idea, embodiments of the present application also provide an electric power supply system. As shown in FIG. 3, the system may include: a power supply controller 201, a main transformer 202, a rectifier filter unit 203, and a control transformer 204.

The power supply controller 201 is connected to the main transformer 202, the rectifier filter unit 203, and the control transformer 204 and is configured for acquiring an electrical energy parameter of electrical energy delivered by an upstream power supply system, determining, based on the acquired electrical energy parameter, whether a preset power supply condition for supplying power to a downstream target power-consuming system is met; determining a target distribution port corresponding to the target power-consuming system from a plurality of preset distribution ports when the preset power supply condition is met, and sending a first power supply signal to the main transformer 202, the rectifier filter unit 203, and the control transformer 204.

The main transformer 202, the rectifier filter unit 203, and the control transformer 204 are configured for supplying electric power to the target power-consuming system through the corresponding target distribution port upon receiving the first power supply signal sent by the power supply controller 201.

With the electric power supply system provided in the embodiments of the present application, the power supply controller is configured for, acquiring an electrical energy parameter of electrical energy delivered by an upstream power supply system, and determining a target distribution port corresponding to the target power-consuming system from a plurality of preset distribution ports when it is determined based on the electrical energy parameter, that a preset power supply condition for supplying power to a downstream target power-consuming system is met; and controlling the supply of electric power to the target power-consuming system through the target distribution port. As a result, the target power-consuming system can operate based on electric energy, which not only solves the environmentally unfriendly and uneconomical problems due to using the traditional diesel as the power source, but also makes it possible to supply power to multiple target power-consuming systems simultaneously with a high degree of integration, high power supply efficiency, and less interference.

Optionally, the main transformer 202 is further connected to a plurality of AC power-consuming systems in the downstream power-consuming systems, and is configured for delivering AC power to the AC power-consuming systems.

The rectifier filter unit 203 is further connected to the main transformer 202 and a plurality of DC power-consuming systems in the downstream power-consuming systems, and is configured for converting the AC power delivered by the main transformer 202 to DC power and delivering the DC power to the connected DC power-consuming systems.

The control transformer 204 is further connected to an instrumentation system in the downstream power-consuming systems, and is configured for controlling the supply of power to the instrumentation system.

Optionally, in one or more embodiments of the present application, the electric power supply system further includes: a high voltage device 205.

The high voltage device 205 is connected to the upstream power supply system, the power supply controller 201, the main transformer 202, and the control transformer 204, and is configured for receiving the electrical energy delivered by the upstream power supply system, controlling the electric power supply system's power-up state and power-down state, and controlling the safety of the electric power supply system based on a preset protection parameter of the electric power supply system. For example, the high voltage device 205 disconnects from the upstream power supply system when it detects that the voltage of the electrical energy delivered by the upstream power supply system is greater than a preset protection voltage of the electric power supply system, in order to protect the electric power supply system, etc.

Optionally, in one or more embodiments of the present application, the electric power supply system further includes: a power-up buffer device 206.

The power-up buffer device 206 is connected to the power supply controller 201, the high voltage device 205, and the main transformer 202, and is configured for pre-magnetizing the main transformer 202 based on the electrical energy delivered by the high voltage device 205 upon receiving a pre-magnetization control signal sent by the power supply controller 201.

Optionally, in one or more embodiments of the present application, the electric power supply system further includes: an energy device which includes an electrical energy management device 207 and an energy storage device 208.

The energy management device 207 is connected to the power supply controller 201, and is configured for sending a second energy storage signal to the energy storage device 208 upon receiving a first energy storage signal sent by the power supply controller 201; and sending a third power supply signal to the energy storage device 208 upon receiving a second power supply signal sent by the power supply controller 201.

The energy storage device 208 is connected to the high voltage device 205, the main transformer 202 and the electrical energy management device 207, and is configured for storing the electrical energy delivered by the high voltage device 205 upon receiving the second energy storage signal sent by the electrical energy management device 207; and supplying power to a corresponding target power-consuming system via the main transformer 202 based on the stored electrical energy, upon receiving the third power supply signal sent by the electrical energy management device 207.

Figure 4:
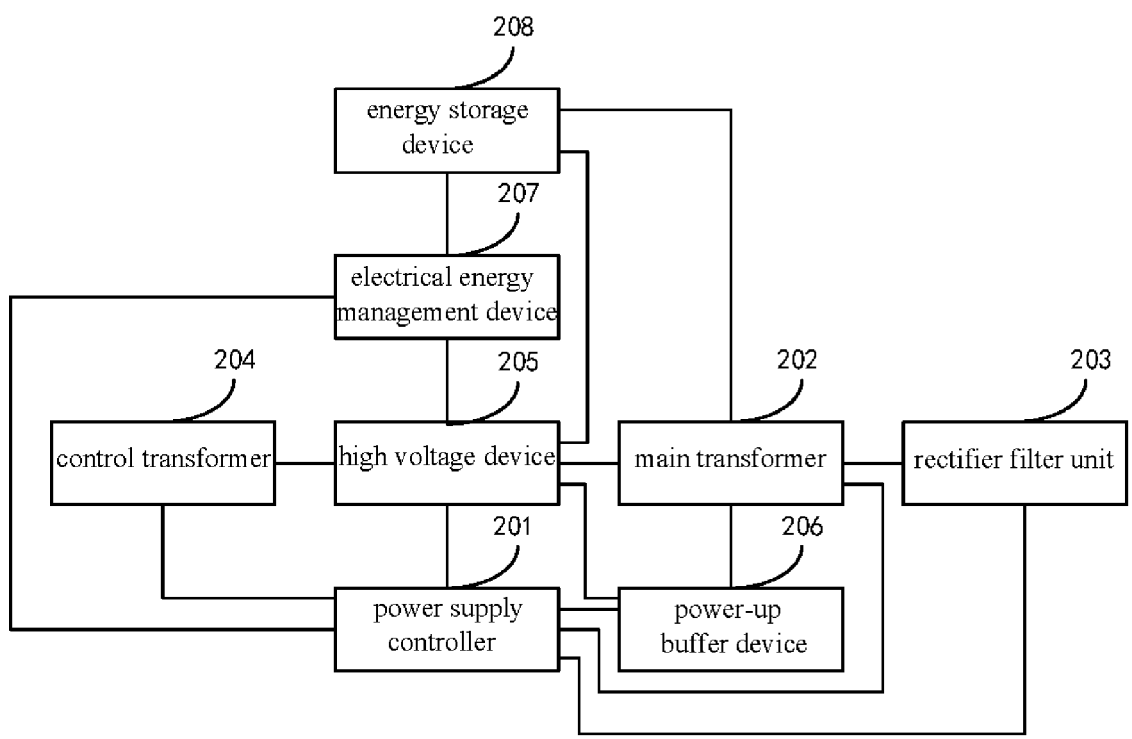
FIG. 4 is a second schematic composition diagram of an electric power supply system, according to various embodiments of the present application.

In one embodiment, as shown in FIG. 4, the electric power supply system may include the power supply controller 201, the main transformer 202, the rectifier filter unit 203, the control transformer 204, the high voltage device 205, the power-up buffer device 206, the electrical energy management device 207, and the energy storage device 208 as described above at the same time. The power supply controller 201 is connected to the main transformer 202, the rectifier filter unit 203, the control transformer 204, the high voltage device 205, the power-up buffer device 206, and the electrical energy management device 207; the high voltage device 205 is connected to the power supply controller 201, the main transformer 202, the control transformer 204, the power-up buffer device 206, the electrical energy management device 207, and the energy storage device 208; and the main transformer 202 is connected to the power supply controller 201, the rectifier filter unit 203, the high voltage device 205, and the power-up buffer device 206. Taking the target power-consuming system includes AC power-consuming system, DC power-consuming system and instrumentation system as an example, a power supply process of the electric power supply system may include that: the high voltage device 205 receives the electrical energy delivered by the upstream power supply system, the electric power supply system is controlled to enter the power-up state and delivers electrical energy to other components in the electric power supply system. Based on the received electrical energy, the power supply controller 201 sends a pre-magnetization control signal to the power-up buffer device 206 and acquires status information of the pre-magnetization, as well as acquires an output voltage of the electric power supply system. The power-up buffer device 206 pre-magnetizes the main transformer 202 based on the received pre-magnetization control signal. When the power supply controller 201 determines that pre-magnetization is complete based on the acquired status information of pre-magnetization, it sends a disconnection signal to the power-up buffer device 206; the power-up buffer device 206 disconnects from the main transformer 202 and stops working based on the received disconnection signal. When the power-up controller 201 determines that the preset power supply condition is met based on the acquired status information of the pre-magnetization and the output voltage, it determines the target distribution port corresponding to the downstream target power-consuming system from the plurality of preset distribution ports, and sends the first power supply signal to the main transformer 202, the rectifier filter unit 203 and the control transformer 204 respectively based on the relevant information (such as identification information) of the target distribution port. Based on the received first power supply signal, the main transformer 202 delivers AC power to the AC power-consuming system in the target power-consuming system through the corresponding target AC distribution port. The rectifier filter unit 203 converts the AC power delivered by the main transformer 202 into DC power according to the received first power supply signal, and then delivers DC power to the DC power-consuming system in the target power-consuming system through the corresponding target DC distribution port. Based on the received first power supply signal, the control transformer 204 delivers AC power to the instrumentation system in the target power-consuming system through the corresponding target AC distribution port.

Further, the power-up controller 201 further determines the critical power-consuming system in the target power-consuming system; and, when the power-up controller 201 determines that the preset energy storage condition is met, it sends a first energy storage signal to the electrical energy management device 207, and the electrical energy management device 207 sends a second energy storage signal to the energy storage device 208 based on the received first energy storage signal; the energy storage device 208 stores the electrical energy delivered by the high voltage device 205 according to the received second energy storage signal. When the power-up controller 201 determines that the preset emergency power supply condition is met, it sends a second power supply signal to the electrical energy management device 207, and the electrical energy management device 207 sends a third power supply signal to the energy storage device 208 based on the received second power supply signal; the energy storage device 208 supplies power to the above-mentioned critical power-consuming system via the main transformer 202 based on the received third power supply signal.

Since the output voltage of the main transformer 202 is usually large enough to meet the voltage required by the connected AC power-consuming system, and the output voltage of the control transformer 204 is also able to meet the voltage required by the instrumentation system, while the output voltage of the rectifier filter unit 203 may be less than the voltage required by the connected DC power-consuming system, the above-mentioned power supply controller 201 acquiring the output voltage of the electric power supply system may include acquiring the output voltage of the rectifier filter unit 203; and, when the power supply controller 201 determines that the acquired status information of the pre-magnetization indicates the completion of the pre-magnetization and determines that the acquired output voltage of the rectifier filter unit 203 reaches the preset voltage, it determines that the preset power supply condition is met. In some embodiments, the power supply controller 201 may also acquire the output voltage of the rectifier filter unit 203, the output voltage of the main transformer 202, and the output voltage of the control transformer 204, and determine that the preset power supply condition is met when it is determined that the acquired status information of the pre-magnetization indicates the completion of the pre-magnetization, and when it is determined that each of the acquired output voltages reaches the corresponding preset voltage.

Figure 5:
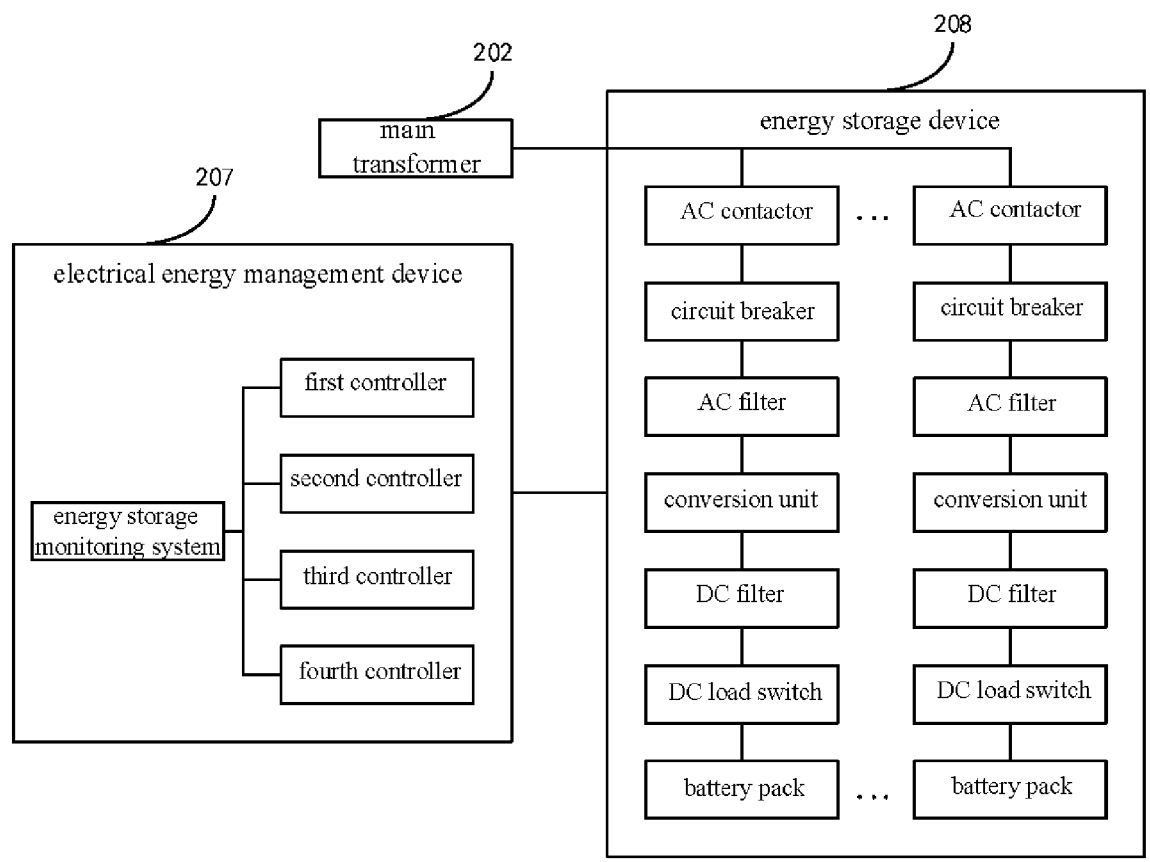
FIG. 5 is a refined schematic diagram of an energy device of an electric power supply system, according to various embodiments of the present application.

A detailed diagram of the structure of the energy device in one or more embodiments of the present application may be seen in FIG. 5. The electrical energy management device 207 may include an energy storage monitoring system, a first controller, a second controller, a third controller, and a fourth controller all connected to the energy storage monitoring system. The energy storage device 208 includes multiple groups of AC contactor, circuit breaker, AC filter, AC unit, DC filters, DC load switch, and battery pack. The first controller can be connected to the AC unit for controlling the AC unit, the second controller can be connected to the AC filter and the DC filter for controlling the AC filter and the DC filter; the third controller can be connected to the battery pack for controlling the battery pack; the fourth controller can be connected to the AC contactor, the circuit breaker, and the DC load switch for controlling the AC contactor, the circuit breaker, and DC load switch. The connection relationship between the first controller to the fourth controller and the components in the energy storage device 208 is not shown in FIG. 5. The energy storage device 208 can automatically detect the voltage and power of the upstream power supply system to achieve bidirectional variable current control; the energy storage device 208 can also have output short circuit protection, DC reverse polarity protection, battery overcharge and discharge protection, battery overcurrent protection, overload protection, lightning protection, and other functions. FIG. 5 is only for illustration and not for limitation, the specific structure of the electrical energy management device 207 and the energy storage device 208 can be set according to the needs in the actual application. For example, the electrical energy management device 207 may also include a temperature control system, through constant temperature and humidity and an air duct design of the battery pack, the optimal working temperature of the battery pack is controlled, so that the battery pack works in a constant optimal working temperature range, thereby improving the working performance of the battery pack and the service life of the battery pack. The electrical energy management device 207 may also include a firefighting system, and the battery pack in the energy storage device 208 uses an automatic firefighting system, which can realize automatic firefighting according to signals such as smoke sensing and temperature sensing to achieve effective control in emergency situations, etc. By arranging the electrical energy management device 207 and the energy storage device 208, it is possible to supply power to the critical power-consuming system through the electrical energy management device 207 and the energy storage device 208 when the upstream power supply system fails or when the upstream power supply system suddenly stops supplying power due to other factors, so as to avoid the failure of the operation of the critical power-consuming system and the damage to the critical power-consuming system caused by the sudden stop of power supply by the upstream system.

Figure 6:
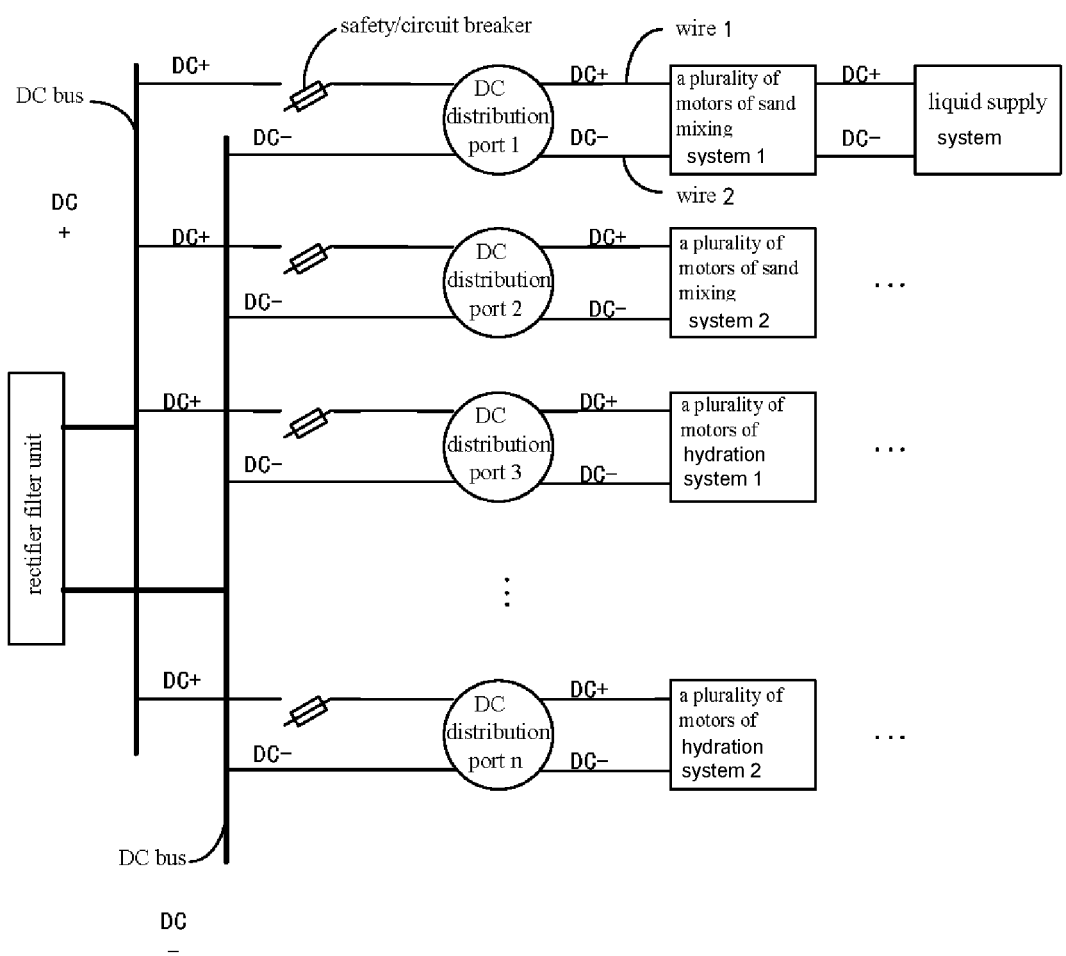
FIG. 6 is a schematic diagram of the connection between a rectifier filter unit and a target power-consuming system, according to various embodiments of the present application.

Further, in order to reduce the cumbersome wiring connection and improve convenience, in one or more embodiments of the present application, the main transformer 202 may be connected to multiple AC power-consuming systems through a DC bus to supply power to the multiple AC power-consuming systems simultaneously; the rectifier filter unit 203 may be connected to multiple DC power-consuming systems through a DC bus to supply power to the multiple DC power-consuming systems simultaneously; the control transformer 204 may be connected to multiple instrumentation systems through the DC bus to supply power to the multiple instrumentation systems simultaneously. As an example, the rectifier filter unit 203 is connected to multiple DC power-consuming systems via the DC bus and the electric power supply system is used in a fracturing well site, as illustrated in FIG. 6. Each DC distribution port can be connected to a plurality of downstream power-consuming systems, such as a DC distribution port 1 can be connected to a plurality of motors of a sand mixing system 1 in the fracturing well site, and a DC distribution port 3 can be connected to a plurality of motors of a hydration system 1 in the fracturing well site, etc. By using the common DC bus technology, a certain power of DC power can be provided to the downstream power-consuming systems simultaneously. In practice, to ensure the smooth operation of each motor, each motor is also provided with a corresponding inverter for speed regulation (not shown in FIG. 6, which can be directly connected to the DC bus. When the motor is in a power supply state, some or all of the electrical energy it provides can be fed back to the DC bus, and can be provided to other motors in an electric state through the DC bus, thus achieving the purpose of energy saving, and thus improving the reliability of system operation and reducing the maintenance of system. For example, if a motor 1 is in the power supply state and feeds back 2 kW of electrical energy to the DC bus, and a motor 2 at this time is in the electric state and needs to consume 10 kW of electrical energy, then the DC bus can obtain 8 kW of electrical energy from the electrical energy provided by the electric power supply system and provide the 8 kW of electrical energy to the motor 2 together with the 2 kW of electrical energy fed back by the motor 1, thus achieving the purpose of energy saving.

In some embodiments, by using a common DC bus for power supply, each motor that needs speed regulation does not need to be powered separately, which can reduce the complexity of the wiring, thus reducing the footprint of the system and improving convenience. As an example, the sand mixing system 1 in FIG. 6 above corresponds to 4 motors, each inverter requires DC power supply. In current technologies, AC-DC-AC is usually used, i.e., AC in AC out, with integrated rectification and inversion power supply, and since the frequency of each motor is often different, a separate three-phase power wire is required for each motor, i.e. 4*3=12 wires. However, with the electric power supply method of common DC bus provided by the embodiment of the present application, it is possible to separate AC-DC and DC-AC, i.e., it is possible to separate rectification and inversion, where the rectification part is in this electric power supply system, so it is possible to output the same DC power through only two wires (wire 1 and wire 2 as shown in FIG. 6) simultaneously to the four inverters corresponding to the four motors of the sand mixing system 1 and having parallel relationship, and then each inverter implements the inversion according to the power of the corresponding motor and delivers the corresponding AC power to the corresponding motor. As can be seen, the technical solution provided by the embodiment of the present application can realize the simultaneous power supply to 4 motors by only 2 wires, which greatly reduces the number of wires, thus reducing the complexity of the wiring and the footprint in existing technologies, which require 12 wires to supply power to 4 motors individually. Each downstream power-consuming system can also be connected to other power-consuming system to supply power to that other power-consuming system, such as the motor of the sand mixing system shown in FIG. 6 can also be connected to a liquid supply device to supply power to the liquid supply system, etc. FIG. 6 is only used for illustration and not for limitation, and the power-consuming system connected to each DC distribution port can be set as needed.

With the electric power supply system provided in the embodiments of the present application, the power supply controller is configured for, acquiring an electrical energy parameter of electrical energy delivered by an upstream power supply system, and when it is determined based on the electrical energy parameter, that a preset power supply condition for supplying power to a downstream target power-consuming system is met, determining a target distribution port corresponding to the target power-consuming system from a plurality of preset distribution ports; and controlling the supply of electric power to the target power-consuming system through the target distribution port. As a result, the target power-consuming system can operate based on electric energy, which not only solves the environmentally unfriendly and uneconomical problems due to taking the traditional diesel as the power source, but also makes it possible to supply power to multiple target power-consuming systems simultaneously with a high degree of integration, high power supply efficiency, and less interference. In addition, by supplying power to the downstream power-consuming system through the common DC bus, it reduces the complexity of line connection, reduces footprint, and improves convenience.

The embodiment of the electric power supply system in this application is based on the same inventive concept as the embodiment of the electric power supply method in the present application, so the specific implementation of the embodiment can be referred to the implementation of the corresponding electric power supply method as mentioned above, and the repetition is not repeated.

Each embodiment in the present application is described in a progressive manner, and the embodiments can be referred to for the same and similar parts of each embodiment, and each embodiment is focused on the differences from other embodiments. In particular, for the system embodiment, since it is basically similar to the method embodiment, the description is relatively simple, and the relevant parts can be found in the method embodiment.

The above description is only an example of the present application, and is not intended to limit the present application. For a person skilled in the art, the present application may have various changes and variations. Any modification, equivalent replacement, improvement, etc. made within the spirit and principle of the present application shall be included in the scope of the claims of the present application.

What is claimed is:

1. An electric power supply method for hydraulic fracturing, comprising:
   acquiring, by a power supply controller in an electric power supply system, an electrical energy parameter of electrical energy from a power supply system, wherein the electric power supply system further comprises a transformer, a rectifier filter, and a control transformer each coupled to the power supply controller, and wherein the transformer is coupled to the rectifier filter;

determining, by the power supply controller based on the electrical energy parameter, whether a power supply condition for supplying power to a target power-consuming system is met;

determining, by the power supply controller, a target AC distribution port corresponding to the transformer, a target DC distribution port corresponding to the rectifier filter, and a target AC distribution port corresponding to the control transformer when the power supply condition is met;

controlling, by the power supply controller sending a first power supply signal to the transformer, the transformer to deliver AC power to an AC power-consuming system in the target power-consuming system through the target AC distribution port corresponding to the transformer;

controlling, by the power supply controller sending the first power supply signal to the rectifier filter, the rectifier filter to convert the AC power delivered by the transformer into DC power according to the first power supply signal, and then deliver the DC power to a DC power-consuming system in the target power-consuming system through the target DC distribution port corresponding to the rectifier filter; and controlling, by the power supply controller sending the first power supply signal to the control transformer, the control transformer to deliver AC power to an instrumentation system in the target power-consuming system through the target AC distribution port corresponding to the control transformer such that the AC power-consuming system, the DC power-consuming system, and the instrumentation system in the target power-consuming system are powered simultaneously.

2. The method according to claim 1, wherein:

the target DC distribution port is connected to the DC power-consuming system by two wires to supply a direct current to the DC power-consuming system; and the target power-consuming system comprises a plurality of motors of a sand mixing system or a hydration system.

3. The method according to claim 1, wherein the electrical energy parameter comprises:

status information of pre-magnetization of the transformer pre-magnetized by a power-up buffer device of the electric power supply system; and an output voltage of the electric power supply system.

4. The method according to claim 3, wherein:

the power-up buffer device is configured to pre-magnetize the transformer based on the electrical energy; and the electric power supply system is configured to output a voltage based on the electrical energy.

5. The method according to claim 3, wherein the power supply condition comprises:

status information indicating a completion of the pre-magnetization of the transformer and the output voltage reaching a voltage threshold.

6. The method according to claim 1, wherein determining the target DC distribution port corresponding to the rectifier filter comprises:

determining the target DC distribution port corresponding to a DC electrical interface of the DC power-consuming system from a plurality of DC distribution ports; and wherein determining the target AC distribution port corresponding to the transformer comprises:

determining the target AC distribution port corresponding to an AC electrical interface of the AC power-consuming system from a plurality of AC distribution ports.

7. The method according to claim 6, wherein determining the target DC distribution port corresponding to the DC electrical interface of the DC power-consuming system from the plurality of DC distribution ports comprises:

detecting whether a current signal corresponding to a respective DC distribution port meets a preset condition, and in response to that current signal corresponding to the respective DC distribution port meets the preset condition, determining the respective DC distribution port as the target DC distribution port corresponding to the DC electrical interface of the DC power-consuming system.

8. The method according to claim 6, wherein determining the target DC distribution port corresponding to the DC electrical interface of the DC power-consuming system from the plurality of DC distribution ports comprises:

acquiring identification information of a recorded target DC distribution port that is recorded during a previous power supply;

displaying a prompt information based on the identification information;

determining whether a confirmation information generated by a user's confirmation operation of the prompt information is acquired; and determining the recorded target DC distribution port as the target DC distribution port corresponding to the DC electrical interface of the DC power-consuming system when the confirmation information is acquired, or determining a DC distribution port corresponding to a received identification information inputted by the user as the target DC distribution port corresponding to the DC electrical interface of the DC power-consuming system when the confirmation information is not acquired.

9. The method according to claim 6, wherein determining the target AC distribution port corresponding to the AC electrical interface of the AC power-consuming system from the plurality of AC distribution ports comprises:

determining whether a closing signal is detected; and determining an AC distribution port corresponding to the closing signal as the target AC distribution port corresponding to the AC power interface of the AC power-consuming system when the closing signal is detected.

10. The method according to claim 6, further comprising:

determining a first supply parameter of the target DC distribution port and/or a second supply parameter of the target AC distribution port;

configuring a power supply parameter for the target DC distribution port according to the first supply parameter and/or a power supply parameter for the target AC distribution port according to the second supply parameter; and controlling the target DC distribution port and/or the target AC distribution port to supply electric power to the target power-consuming system based on the first supply parameter and/or the second supply parameter.

11. The method according to claim 10, wherein determining the first supply parameter of the target DC distribution port and/or the second supply parameter of the target AC distribution port comprises:
acquiring a power supply parameter from association relationships between pairs of identification information and power supply parameter according to identification information of the target DC distribution port; and
determining the acquired power supply parameter as the first supply parameter of the target DC distribution port.

12. The method according to claim 10, wherein determining the first supply parameter of the target DC distribution port and/or the second supply parameter of the target AC distribution port comprises:
determining a power of each AC power-consuming system in the target power-consuming system; and
determining the second supply parameter of the target AC distribution port according to the determined power.

13. The method according to claim 1, further comprising:
controlling, by the power supply controller, an energy storage device of the electric power supply system to store energy when determining that an energy storage condition is met.

14. The method according to claim 13, further comprising:
determining, by the power supply controller, one power-consuming system in the target power-consuming system;
marking, by the power supply controller, a first distribution port corresponding to the one power-consuming system; and
controlling, by the power supply controller, the energy storage device to supply power to the one power-consuming system through the first distribution port when determining that an emergency power supply condition is met.

15. The method according to claim 1, further comprising:
acquiring, by the power supply controller, a power consumption parameter of the target power-consuming system;
generating, by the power supply controller, a protection parameter of the target power-consuming system according to the power consumption parameter; and
performing, by the power supply controller, a protecting processing for the target power-consuming system based on the protection parameter.

16. An electric power supply system, comprising: a power supply controller, a transformer, a rectifier filter, and a control transformer;
wherein the power supply controller is connected to the transformer, the rectifier filter, and the control transformer, and the transformer is coupled to the rectifier filter;
wherein the power supply controller is configured to acquire an electrical energy parameter of electrical energy from a power supply system, determine, based on the electrical energy parameter, whether a power supply condition for supplying power to a target power-consuming system is met; and when the power supply condition is met, determine a target AC distribution port corresponding to the transformer, a target DC distribution port corresponding to the rectifier filter, and a target AC distribution port corresponding to the control transformer, wherein the power supply controller is configured to:

control, by sending a first power supply signal to the transformer, the transformer to deliver AC power to an AC power-consuming system in the target power-consuming system through the target AC distribution port corresponding to the transformer;
control, by sending the first power supply signal to the rectifier filter, the rectifier filter to convert the AC power delivered by the transformer into DC power according to the first power supply signal, and then deliver the DC power to a DC power-consuming system in the target power-consuming system through the target DC distribution port corresponding to the rectifier filter; and
control, by sending the first power supply signal to the control transformer, the control transformer to deliver AC power to an instrumentation system in the target power-consuming system through the target AC distribution port corresponding to the control transformer such that the AC power-consuming system, the DC power-consuming system, and the instrumentation system in the target power-consuming system are powered simultaneously.

17. The electric power supply system according to claim 16, wherein:
the electric power supply system further comprises a high voltage device connected to the power supply system, the power supply controller, the transformer, and the control transformer; and
the high voltage device is configured to receive electrical energy from the power supply system.

18. The electric power supply system according to claim 17, wherein:
the electric power supply system further comprises: a power-up buffer device connected to the power supply controller, the high voltage device, and the transformer; and
the power-up buffer device is configured to pre-magnetize the transformer based on electrical energy from the high voltage device upon receiving a pre-magnetization control signal from the power supply controller.

19. The electric power supply system according to claim 17, wherein:
the electric power supply system further comprises:
an electrical energy management device and an energy storage device;
the energy management device is connected to the power supply controller;
the energy management device is configured to send a second energy storage signal to the energy storage device upon receiving a first energy storage signal from the power supply controller; and send a third power supply signal to the energy storage device upon receiving a second power supply signal from the power supply controller;
the energy storage device is connected to the high voltage device, the transformer, and the electrical energy management device;
the energy storage device is configured to store electrical energy from the high voltage device upon receiving the second energy storage signal from the electrical energy management device, and supply power to the target power-consuming system via the transformer based on the stored electrical energy upon receiving the third power supply signal from the electrical energy management device.

* * * * *